(12) United States Patent
Tang et al.

(10) Patent No.: US 11,196,849 B2
(45) Date of Patent: Dec. 7, 2021

(54) SCREEN ASSEMBLY, ELECTRONIC DEVICE, AND METHOD FOR MANUFACTURING ELECTRONIC DEVICE

(71) Applicant: GUANGDONG OPPO MOBILE TELECOMMUNICATIONS CORP., LTD., Guangdong (CN)

(72) Inventors: Yimei Tang, Guangdong (CN); Jiao Cheng, Guangdong (CN); Min Liu, Guangdong (CN); Zhibin Ouyang, Guangdong (CN)

(73) Assignee: SHENZHEN HEYTAP TECHNOLOGY CORP., LTD., Shenzhen (CN)

( * ) Notice: Subject to any disclaimer, the term of this patent is extended or adjusted under 35 U.S.C. 154(b) by 0 days.

(21) Appl. No.: 16/953,999

(22) Filed: Nov. 20, 2020

(65) Prior Publication Data
US 2021/0072588 A1   Mar. 11, 2021

Related U.S. Application Data

(63) Continuation of application No. PCT/CN2019/085536, filed on May 5, 2019.

(30) Foreign Application Priority Data

Jul. 6, 2018  (CN) .......................... 201810736475.5

(51) Int. Cl.
*H04M 1/02* (2006.01)
*G02F 1/1333* (2006.01)
(Continued)

(52) U.S. Cl.
CPC .... *H04M 1/0264* (2013.01); *G02F 1/133308* (2013.01); *G02F 1/133512* (2013.01);
(Continued)

(58) Field of Classification Search
CPC . H04N 5/2256; H04N 5/2257; H04M 1/0264; G02F 1/133512; G02F 2202/28
See application file for complete search history.

(56) References Cited

U.S. PATENT DOCUMENTS 10,267,976 B1 *  4/2019  Zheng ................. G02B 6/0045
2001/0040658 A1  11/2001  Nemoto et al.
(Continued)

FOREIGN PATENT DOCUMENTS

CN       107229148 A     10/2017
CN       107241466 A     10/2017
(Continued)

OTHER PUBLICATIONS

The First Office Action with English Translation issued in corresponding CN application No. 201810736475.5 dated Apr. 13, 2020.
(Continued)

*Primary Examiner* — Edmond C Lau
*Assistant Examiner* — Jonathan Y Jung
(74) *Attorney, Agent, or Firm* — Young Basile Hanlon & MacFarlane, P.C.

(57) ABSTRACT

A screen assembly, an electronic device, and a method for manufacturing the electronic device are provided. The screen assembly includes a liquid crystal panel, a backlight module, a camera, and a light-shielding adhesive layer. The backlight module is disposed on a side of the liquid crystal panel, defines a fist through hole, and includes a plastic ring disposed in the first through hole. The camera is at least partially received in the first through hole and fixed in the first through hole via the plastic ring. The light-shielding adhesive layer is disposed between the backlight module and the liquid crystal panel. A vertical projection of the light-shielding adhesive layer on the liquid crystal panel is within a vertical projection of the plastic ring on the liquid crystal
(Continued)

panel. The light-shielding adhesive layer is operable to prevent lights leaked from the backlight module from entering a light-incident surface of the camera.

18 Claims, 10 Drawing Sheets

(51) Int. Cl.
*G02F 1/1335* (2006.01)
*H04N 5/225* (2006.01)
*G06F 1/16* (2006.01)

(52) U.S. Cl.
CPC ...... *G02F 1/133528* (2013.01); *G06F 1/1637* (2013.01); *G06F 1/1686* (2013.01); *G02F 1/13332* (2021.01); *G02F 2202/28* (2013.01); *H04N 5/2256* (2013.01); *H04N 5/2257* (2013.01)

(56) References Cited

U.S. PATENT DOCUMENTS

2011/0261283 A1* 10/2011 Kim ..................... H04N 5/2257 349/58
2012/0105400 A1* 5/2012 Mathew ................ G06F 1/1686 345/207
2016/0357053 A1* 12/2016 Chen ..................... G02B 6/0055
2017/0187934 A1* 6/2017 Kwak ............... G02F 1/133512
2018/0146084 A1 5/2018 Diebel
2019/0123218 A1* 4/2019 Min ........................ H01L 31/18

FOREIGN PATENT DOCUMENTS

| CN | 107248374 A | 10/2017 | |
|---|---|---|---|
| CN | 107272242 A | 10/2017 | |
| CN | 107277196 A | 10/2017 | |
| CN | 207264062 U | 4/2018 | |
| CN | 207541546 U | 6/2018 | |
| CN | 108427228 A * | 8/2018 | .......... G02B 6/0075 |
| EP | 3780565 A1 | 2/2021 | |

OTHER PUBLICATIONS

The Second Office Action with English Translation issued in corresponding CN application No. 201810736475.5 dated Oct. 10, 2020.
International search report with English Translation issued in corresponding international application No. P../CN2019/085536 dated Jul. 25, 2019.
China Office Action with English translation for CN Application 201810736475.5 dated Feb. 1, 2021. (11 pages).
Extended European Search Report for EP Application 19830385.1 dated Jul. 16, 2021. (7 pages).

* cited by examiner

SCREEN ASSEMBLY, ELECTRONIC DEVICE, AND METHOD FOR MANUFACTURING ELECTRONIC DEVICE

CROSS-REFERENCE TO RELATED APPLICATION(S)

This application is a continuation of International Application No. PCT/CN2019/085536, filed on May 5, 2019, which claims priority to Chinese Patent Application No. 201810736475.5, filed on Jul. 6, 2018, the entire disclosures of both of which are hereby incorporated by reference.

TECHNICAL FIELD

This disclosure relates to the technical field of electronic devices, and in particular, to a screen assembly, an electronic device, and a method for manufacturing an electronic device.

BACKGROUND

With the development of technology, electronic devices such as mobile phones and tablet computers have increasingly become important in people's work and daily life. Consumers not only pay attention to functions of the electronic device, but also have higher and higher requirements for appearance of the electronic device. The full-screen design with a relatively high screen-to-body ratio has brought a great impact to users, and is deeply loved and sought after by the users.

SUMMARY

A screen assembly is provided according to an implementation of the present disclosure. The screen assembly includes a liquid crystal panel, a backlight module, a camera, and a light-shielding adhesive layer. The backlight module is disposed on a side of the liquid crystal panel, defines a fist through hole, and includes a plastic ring disposed in the first through hole. The camera is at least partially received in the first through hole and fixed in the first through hole via the plastic ring. The light-shielding adhesive layer is disposed between the backlight module and the liquid crystal panel. A vertical projection of the light-shielding adhesive layer on the liquid crystal panel is within a vertical projection of the plastic ring on the liquid crystal panel. The light-shielding adhesive layer is operable to prevent lights leaked from the backlight module from entering a light-incident surface of the camera.

An electronic device is further provided according to an implementation of the present disclosure. The electronic device includes a screen assembly. The screen assembly includes a liquid crystal panel, a backlight module, a camera, and a light-shielding adhesive layer. The backlight module is disposed on a side of the liquid crystal panel, defines a fist through hole, and includes a plastic ring disposed in the first through hole. The camera is at least partially received in the first through hole and fixed in the first through hole via the plastic ring. The light-shielding adhesive layer is disposed between the backlight module and the liquid crystal panel. A vertical projection of the light-shielding adhesive layer on the liquid crystal panel is within a vertical projection of the plastic ring on the liquid crystal panel. The light-shielding adhesive layer is operable to prevent lights leaked from the backlight module from entering a light-incident surface of the camera.

A method for manufacturing an electronic device is further provided according to an implementation of the present disclosure. The method for manufacturing the electronic device includes the following. Provide a liquid crystal panel and install a backlight module on the liquid crystal panel, where the backlight module defines a first through hole and includes a plastic ring disposed in the first through hole. Spray light-shielding adhesive between the liquid crystal panel and the backlight module to form a light-shielding adhesive layer, where a vertical projection of the light-shielding adhesive layer on the liquid crystal panel is within a vertical projection of the plastic ring on the liquid crystal panel. Insert the camera in the first through hole, where the light-shielding adhesive layer is operable to prevent lights leaked from the backlight module from entering a light-incident surface of the camera.

BRIEF DESCRIPTION OF DRAWINGS

To describe technical solutions in implementations of the present disclosure more clearly, the following will briefly introduce accompanying drawings required for describing the implementations. Apparently, the accompanying drawings in the following description merely illustrate some implementations of the present disclosure. Those of ordinary skill in the art may also obtain other accompanying drawings based on these accompanying drawings without creative efforts.

DETAILED DESCRIPTION

Figure 1:
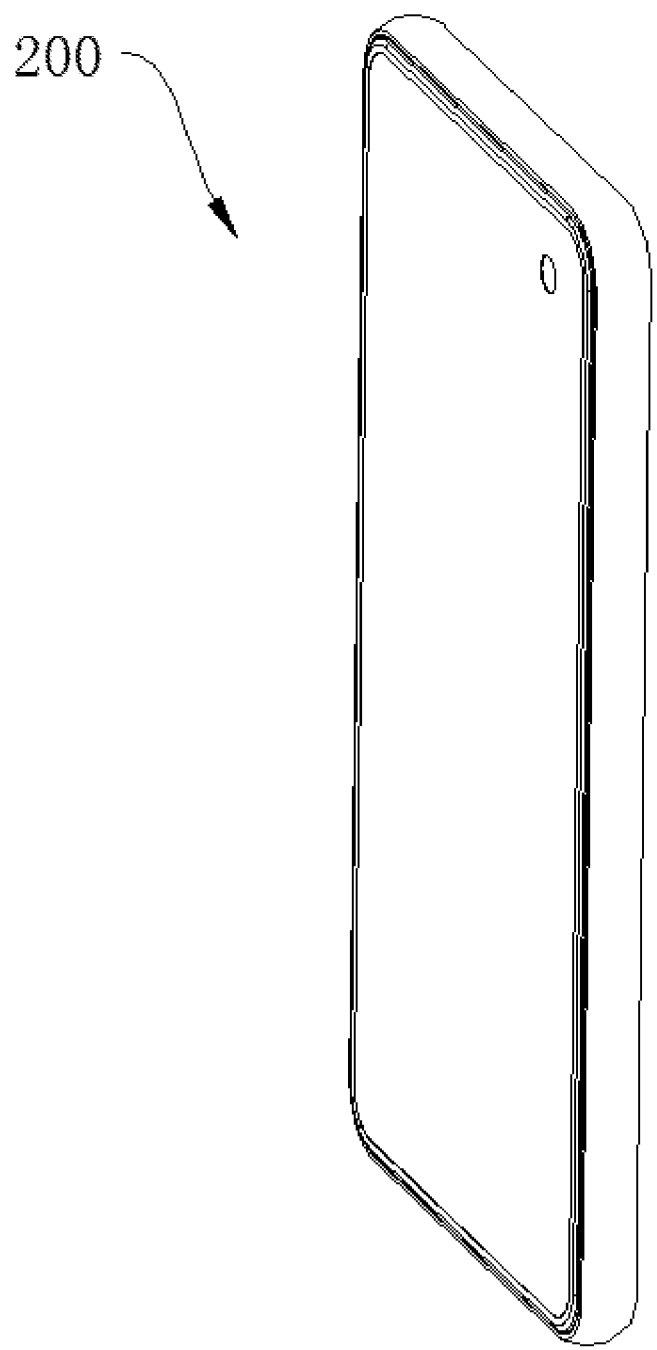
FIG. 1 is a schematic view illustrating an electronic device according to an implementation of the present disclosure.

According to an aspect, a screen assembly is provided according to an implementation of the present disclosure. The screen assembly includes a liquid crystal panel, a backlight module, a camera, and a light-shielding adhesive layer. The backlight module is disposed on a side of the liquid crystal panel, defines a fist through hole, and includes a plastic ring disposed in the first through hole. The camera is at least partially received in the first through hole and fixed in the first through hole via the plastic ring. The light-shielding adhesive layer is disposed between the backlight module and the liquid crystal panel. A vertical projection of the light-shielding adhesive layer on the liquid crystal panel is within a vertical projection of the plastic ring on the liquid crystal panel. The light-shielding adhesive layer is operable to prevent lights leaked from the backlight module from entering a light-incident surface of the camera.

According to a first possible implementation, the liquid crystal panel includes an inner surface facing the backlight module. The plastic ring includes a top side surface facing the liquid crystal panel. The light-shielding adhesive layer is in contact with the inner surface and the top side surface, such that the light-shielding adhesive layer is compressed between the liquid crystal panel and the plastic ring.

In combination with the first possible implementation, according to a second possible implementation, the screen assembly further includes a first polarizer disposed between the liquid crystal panel and the backlight module. The first polarizer defines a light-transmitting hole directly facing the first through hole, and the light-shielding adhesive layer is disposed in the light-transmitting hole.

In combination with the second possible implementation, according to a third possible implementation, the camera includes a housing and an optical member received in the housing. The housing defines an opening to expose the optical member. The light-shielding adhesive layer is in the shape of a ring. Ambient lights pass through a central hole in the light-shielding adhesive layer and the opening sequentially to be imaged on the optical member.

In combination with the third possible implementation, according to a fourth possible implementation, the plastic ring includes a first inner wall facing the camera. The light-shielding adhesive layer includes a second inner wall facing the camera, and the second inner wall is flush with the first inner wall.

In combination with the second possible implementation, according to a fifth possible implementation, the inner surface defines a recess, and the light-shielding layer is partially received in the recess.

According to a sixth possible implementation, the screen assembly further includes a transparent cover disposed on a side of the liquid crystal panel facing away from the backlight module.

According to another aspect, an electronic device is further provided according to an implementation of the present disclosure. The electronic device includes a screen assembly. The screen assembly includes a liquid crystal panel, a backlight module, a camera, and a light-shielding adhesive layer. The backlight module is disposed on a side of the liquid crystal panel, defines a fist through hole, and includes a plastic ring disposed in the first through hole. The camera is at least partially received in the first through hole and fixed in the first through hole via the plastic ring. The light-shielding adhesive layer is disposed between the backlight module and the liquid crystal panel. A vertical projection of the light-shielding adhesive layer on the liquid crystal panel is within a vertical projection of the plastic ring on the liquid crystal panel. The light-shielding adhesive layer is operable to prevent lights leaked from the backlight module from entering a light-incident surface of the camera.

According to a first possible implementation, the liquid crystal panel includes an inner surface facing the backlight module. The plastic ring includes a top side surface facing the liquid crystal panel. The light-shielding adhesive layer is in contact with the inner surface and the top side surface, such that the light-shielding adhesive layer is compressed between the liquid crystal panel and the plastic ring.

According to a second possible implementation, the screen assembly further includes a first polarizer disposed between the liquid crystal panel and the backlight module. The first polarizer defines a light-transmitting hole directly facing the first through hole, and the light-shielding adhesive layer is disposed in the light-transmitting hole.

In combination with the second possible implementation, according to a third possible implementation, the camera includes a housing and an optical member received in the housing. The housing defines an opening to expose the optical member. The light-shielding adhesive layer is in the shape of a ring. Ambient lights pass through a central hole in the light-shielding adhesive layer and the opening sequentially to be imaged on the optical member.

In combination with the third possible implementation, according to a fourth possible implementation, the plastic ring includes a first inner wall facing the camera. The light-shielding adhesive layer includes a second inner wall facing the camera, and the second inner wall is flush with the first inner wall.

In combination with the second possible implementation, according to a fifth possible implementation, the inner surface defines a recess, and the light-shielding layer is partially received in the recess.

According to a sixth possible implementation, the screen assembly further includes a transparent cover disposed on a side of the liquid crystal panel facing away from the backlight module.

According to a seventh possible implementation, the electronic device further includes a front casing and a circuit board. The screen assembly and the circuit board are respectively disposed on two opposite sides of the front casing. The front casing defines a second through hole directly facing the first through hole, and the camera is disposed on the circuit board and passes through the second through hole to be partially received in the first through hole.

According to an eighth possible implementation, an interference fit exists between the camera and the second through hole.

According to yet another aspect, a method for manufacturing an electronic device is further provided according to an implementation of the present disclosure. The method for manufacturing the electronic device includes the following. Provide a liquid crystal panel and install a backlight module on the liquid crystal panel, where the backlight module defines a first through hole and includes a plastic ring disposed in the first through hole. Spray light-shielding adhesive between the liquid crystal panel and the backlight module to form a light-shielding adhesive layer, where a vertical projection of the light-shielding adhesive layer on the liquid crystal panel is within a vertical projection of the plastic ring on the liquid crystal panel. Insert the camera in the first through hole, where the light-shielding adhesive layer is operable to prevent lights leaked from the backlight module from entering a light-incident surface of the camera.

According to a first possible implementation, prior to installing the backlight module on the liquid crystal panel, the method for manufacturing the electronic device further includes the following. Attach a first polarizer to the liquid crystal panel, where the first polarizer defines a light-transmitting hole. Installing the backlight module on the liquid crystal panel includes the following. Install the backlight module on a side of the liquid crystal panel facing the first polarizer, where the first through hole directly faces the light-transmitting hole.

According to a second possible implementation, prior to installing the backlight module on the liquid crystal panel, the method for manufacturing the electronic device further includes the following. Provide a transparent cover, and attach the liquid crystal panel to the transparent cover.

According to a third possible implementation, prior to inserting the camera in the first through hole, the method for manufacturing the electronic device further includes the following. Install the camera on a circuit board. Install the circuit board on a front casing, where the front casing defines a second through hole, and the camera passes through the second through hole.

Figure 2:
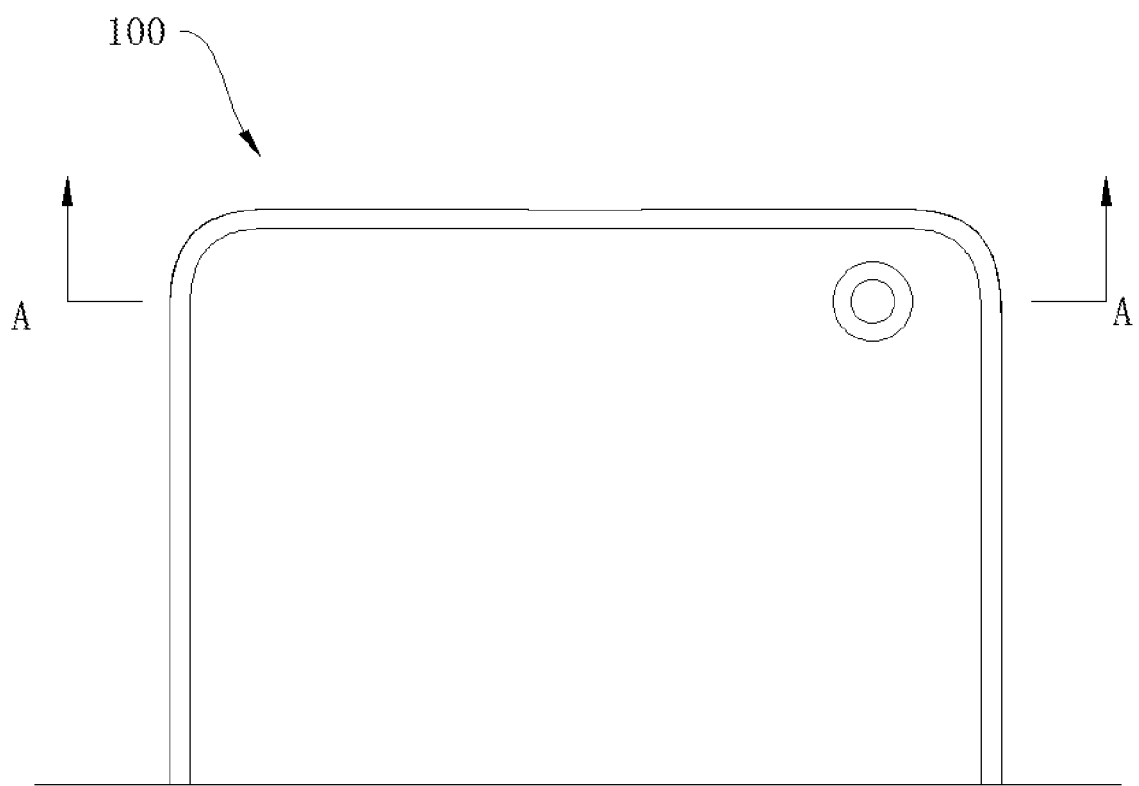
FIG. 2 is a front view illustrating a screen assembly according to an implementation of the present disclosure.

Referring to FIG. 1 and FIG. 2, a screen assembly 100 provided according to an implementation of the present disclosure is applied to an electronic device 200. The electronic device 200 may include but not limited to a mobile phone, a tablet computer, a laptop computer, and the like.

Figure 3:
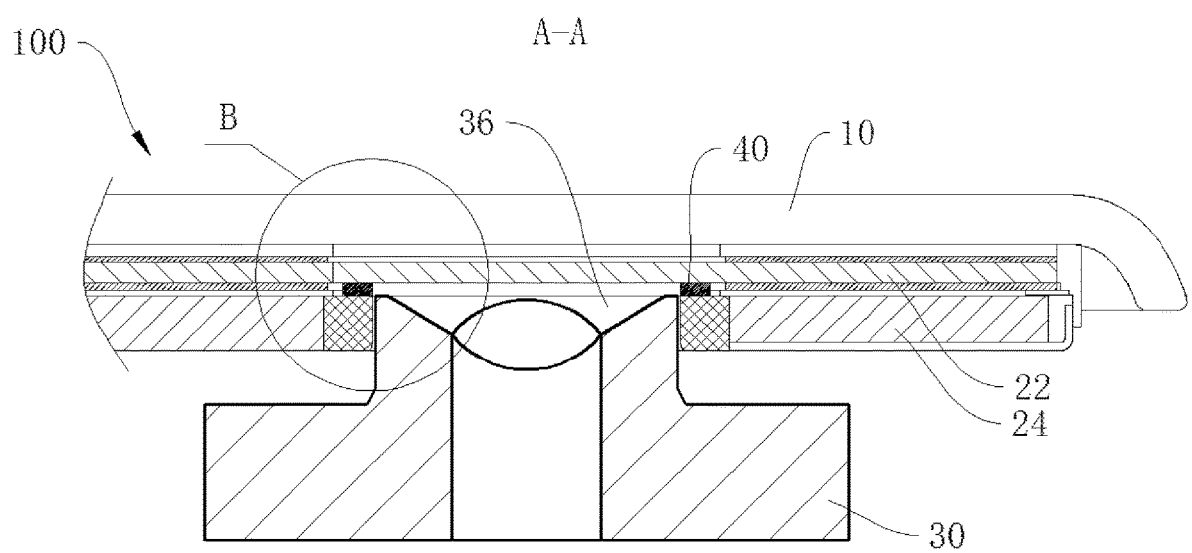
FIG. 3 is a cross-sectional view of the screen assembly illustrated in FIG. 2, taken along direction A-A.
Figure 4:
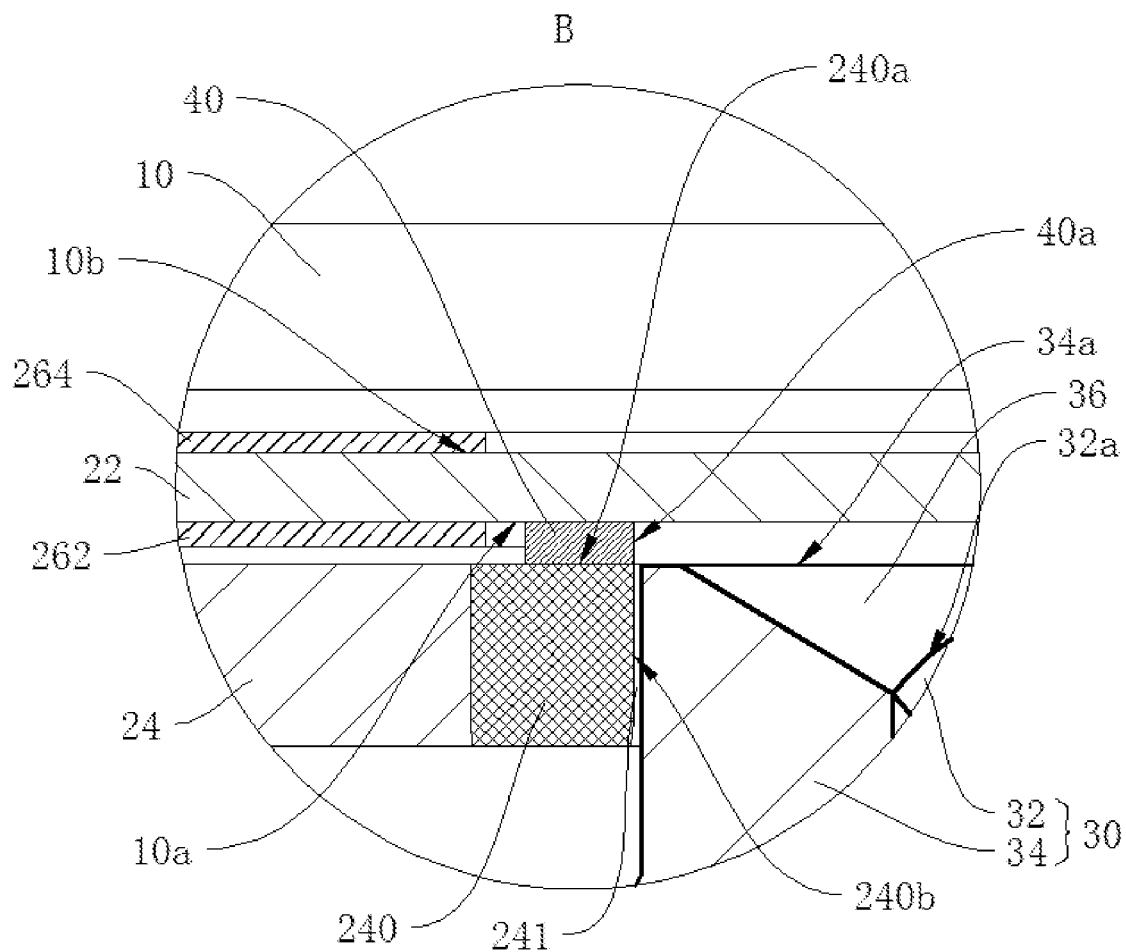
FIG. 4 is an enlarged view of portion B illustrated in FIG. 3.

FIG. 2 is a front view illustrating the screen assembly 100 according to an implementation of the present disclosure, and FIG. 3 is a cross-sectional view of the screen assembly 100 illustrated in FIG. 2, taken along direction A-A. The screen assembly 100 provided in the implementation of the present disclosure includes a transparent cover 10, a liquid crystal panel 22, a backlight module 24, a camera 30, and a light-shielding adhesive layer 40. The transparent cover 10 has a certain strength and a high light transmittance. The transparent cover 10 is operable to protect components disposed below the transparent cover 10 such as the liquid crystal panel 22. In an implementation, the transparent cover 10 is a glass cover. The light transmittance of the glass cover is high and the cost of the glass cover is relatively low. In other implementations, the transparent cover 10 may also be a plastic cover. In combination with FIG. 3 and FIG. 4, FIG. 4 is a partially enlarged view of FIG. 3. The liquid crystal panel 22 is disposed on a side of the transparent cover 10. The liquid crystal panel 22 includes an outer surface 10b and an inner surface 10a opposite the outer surface 10b. The outer surface 10b faces outside of the electronic device 200. In other words, when the electronic device 200 is used by a user, the outer surface 10b of the liquid crystal panel 22 faces the user. Correspondingly, the inner surface 10a faces inside of the electronic device 200. The inner surface 10a is a surface of the liquid crystal panel 22 facing the backlight module 24. In the implementation, the transparent cover 10 is disposed on the outer surface 10b of the liquid crystal panel 22. In an implementation, the liquid crystal panel 22 is attached to the transparent cover 10 via optically clear adhesive (OCA). The OCA has a high adhesive strength and relatively high transparency, which may have a low impact on display effects of the liquid crystal panel 22.

Referring further to FIG. 3 and FIG. 4, the backlight module 24 is disposed on a side of the liquid crystal panel 22. In an implementation, the backlight module 24 is disposed on the side of the liquid crystal panel 22 facing away from the transparent cover 10, that is, disposed on the inner surface 10a. The backlight module 24 is operable to provide backlight source for the liquid crystal panel 22, such that the liquid crystal panel 22 can display an image(s). In combination with FIG. 5 and FIG. 6, in an implementation, the backlight module 24 defines a first through hole 241. Referring to FIG. 2, the first through hole 241 is within a display region of the screen assembly 100, which is beneficial to reduce effect of the first through hole 241 on a screen-to-body ratio of the screen assembly 100. Furthermore, the first through hole 241 is a through hole extending through the backlight module 24. In an implementation, the first through hole 241 is in the shape of a circle.

Referring to FIG. 3 and FIG. 4, in an implementation, the camera 30 is at partially received in the first through hole 241. A light-incident surface 32a of the camera 30 faces the liquid crystal panel 22. In other words, ambient lights pass through the transparent cover 10 and the liquid crystal panel 22 and then enter the light-incident surface 32a of the camera 30 to form an image. In the implementation of the present disclosure, the camera 30 is partially received in the first through hole 241, which can reduce a size of the first through hole 241. The camera 30 is disposed in a hole below the screen assembly 100, which can reduce a space occupied by the camera 30 in a display region of the screen assembly 100, thereby increasing the screen-to-body ratio of the electronic device.

Referring to FIG. 3 and FIG. 4, in an implementation, the backlight module 24 is further operable to fix the camera 30. In an implementation, the backlight module 24 defines a plastic ring 240. The plastic ring 240 is disposed in the first through hole 241. The camera 30 is fixed in the first through hole 241 via the plastic ring 240. The plastic ring 240 has a certain elasticity, which can prevent the backlight module 24 and the camera 30 from being scratched and damaged.

Referring further to FIG. 3 and FIG. 4, in an implementation, the light-shielding adhesive layer 40 is disposed between the backlight module 24 and the liquid crystal panel 22, and a vertical projection of the light-shielding adhesive layer 40 on the liquid crystal panel 22 is within a vertical projection of the plastic ring 240 on the liquid crystal panel 22. The light-shielding adhesive layer 40 can prevent lights leaked from the backlight module 24 from entering the light-incident surface 32a of the camera 30. The light-shielding adhesive layer 40 has certain elasticity, is light, and can be quickly fixed via pressure-sensitive fixation, conveniently used, freely bent, and made to be ultrathin, and is reliable. In the implementation, a side of the light-shielding adhesive layer 40 is disposed on the inner surface 10a of the liquid crystal panel 22, and the other side of the light-shielding adhesive layer 40 abuts against the plastic ring 240, such that the light-shielding adhesive layer 40 is compressed between the liquid crystal panel 22 and the backlight module 24. When the light-shielding adhesive layer 40 is compressed, the light-shielding adhesive layer 40 has a certain deformation, such that a joint between the light-shielding adhesive layer 40 and the liquid crystal panel 22 can be well sealed. Furthermore, the plastic ring 240 includes a top side surface 240a facing the liquid crystal panel 22. The top side surface 240a is in contact with the light-shielding adhesive layer 40, such that the light-shielding adhesive layer 40 is compressed between the top side surface 240a and the inner surface 10a.

Figure 7:
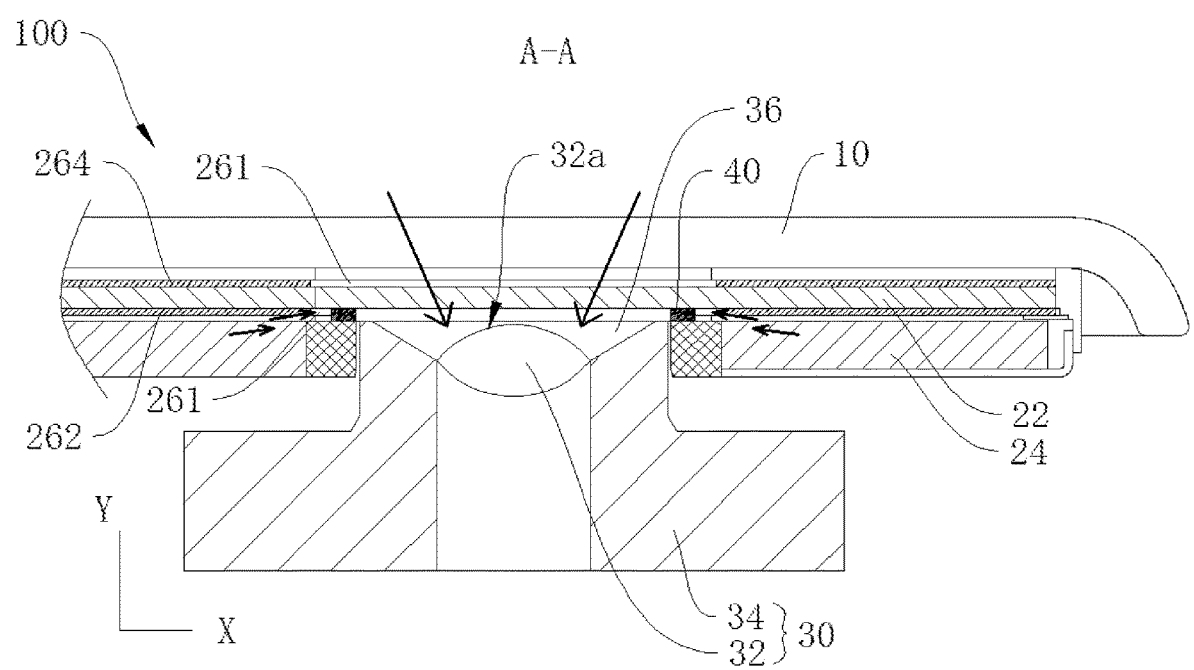
FIG. 7 is a schematic view illustrating a working principle of a screen assembly according to an implementation of the present disclosure.

Referring to FIG. 7, the camera 30 includes a housing 34 and an optical member 32 received in the housing 34. The housing 34 defines an opening to expose the optical member 32. In an implementation, a top portion of the housing 34 is in the shape of a cylinder. The optical member 32 is disposed in the top portion in the shape of a cylinder and receives ambient lights via the opening 36. In a first direction X, i.e., a radial direction of the first through hole 241, the optical member 32 is separated from the backlight module 24 via the housing 34. The housing 34 includes a top surface 34a (see FIG. 8). The light-incident surface 32a of the camera 30 is a surface of the optical member 32 that receives the ambient lights. The light-incident surface 32a of the camera 30 is recessed in the camera 30. In other words, in a second direction Y, i.e., an axial direction of the first direction, the light-incident surface 32a of the camera 30 is disposed below the top surface 34a. As illustrated in FIG. 7, lights from the backlight module 24 may inevitably leak out via the first through hole 241. The lights that leak out via the first through hole 241 travel towards the camera 30. The light-shielding adhesive layer 40 blocks a propagation of the lights to the optical member 32 in the housing 34, that is, prevents the backlight module 24 from providing the lights to the camera 30, i.e., prevents the light-incident surface 32a of the camera 30 from receiving the lights leaked from the backlight module 24, thereby improving shooting effects of the camera 30.

Referring to FIG. 3 and FIG. 4, in an implementation, the light-shielding adhesive layer 40 is in the shape of a ring. The ambient lights pass through a central hole in the light-shielding adhesive layer 40 and the opening 36 sequentially and then enter the light-incident surface 32a to be imaged on the optical member 32. In combination with FIG. 7, only the ambient lights that pass through the transparent cover 10 and the liquid crystal panel 22 can pass through the central hole in the light-shielding adhesive layer 40 and the opening 36 to be imaged on the optical member 32, and the lights leaked from the backlight module 24 are prevented from entering the optical member 32 due to the light-shielding adhesive layer 40.

Figure 5:
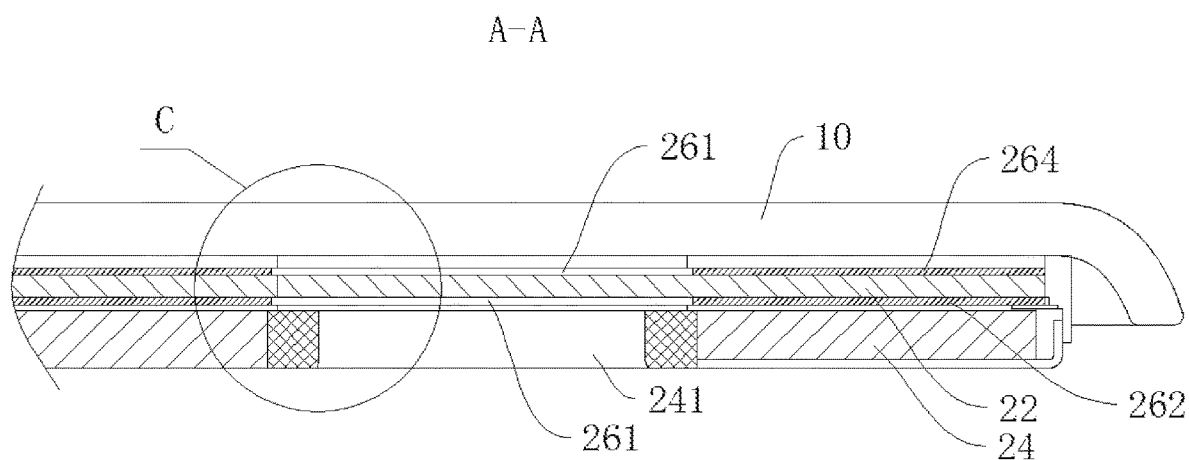
FIGS. 5-6 are schematic views illustrating a screen assembly according to an implementation of the present disclosure.
Figure 6:
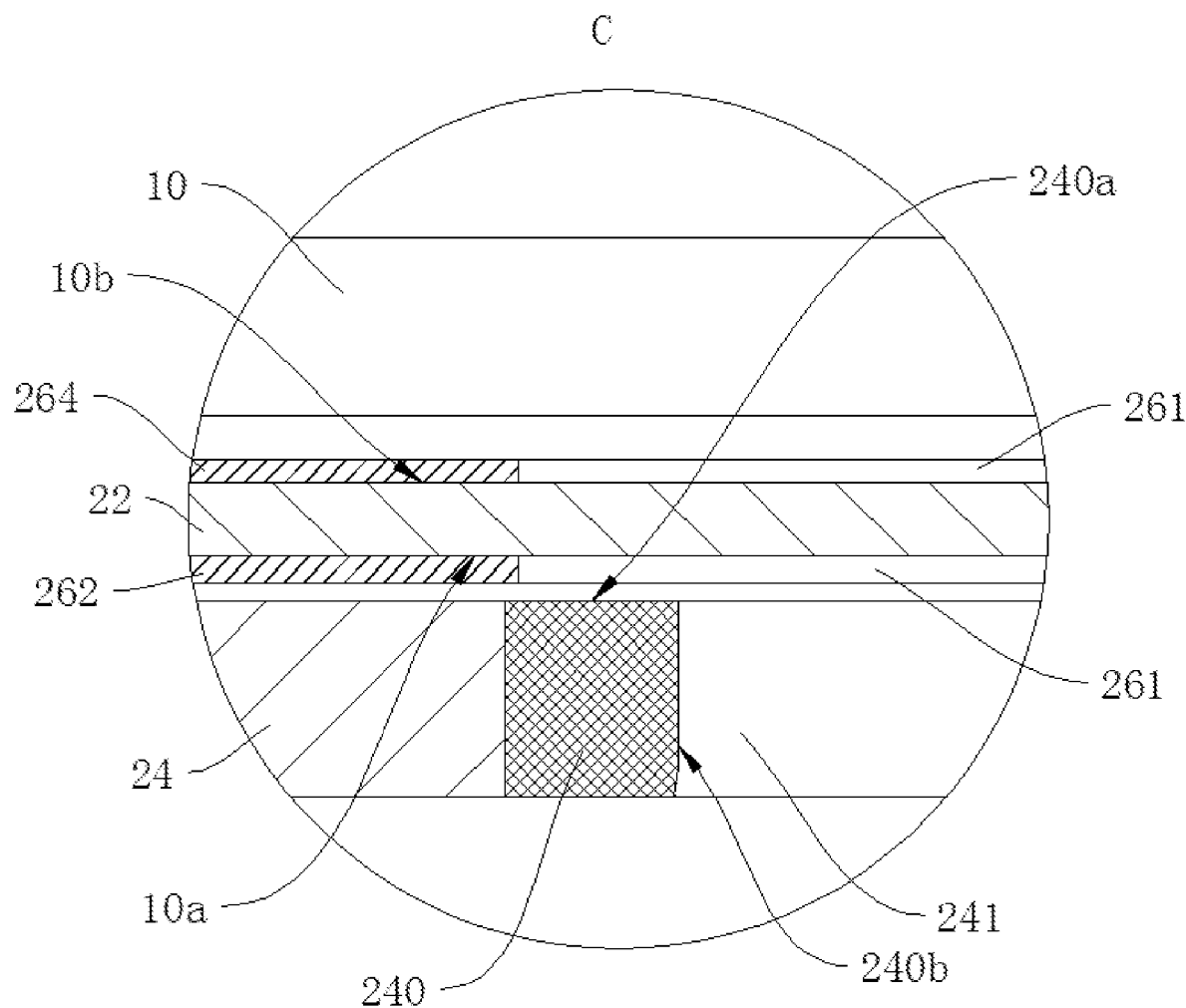

Referring to FIG. 5 and FIG. 6, in an implementation, the screen assembly 100 further includes a first polarizer 262 and a second polarizer 264 that are symmetrically disposed on two opposite sides of the liquid crystal panel 22. The first polarizer 262 is disposed between the liquid crystal panel 22 and the backlight module 24. The second polarizer 264 is disposed between the liquid crystal panel 22 and the transparent cover 10. In an implementation, the first polarizer 262 is attached to the inner surface 10a of the liquid crystal panel 22, and the second polarizer 264 is attached to the outer surface 10b of the liquid crystal panel 22. In an implementation, the first polarizer 262 and the second polarizer 264 both define a light-transmitting hole 261 directly facing the first through hole 241. With the light-transmitting hole 261 ambient lights can pass through positions of the polarizers corresponding to the camera 30, such that the ambient lights can enter the light-incident surface 32a of the camera 30 to form an image, thereby avoiding that the ambient lights cannot enter the light-incident surface 32a due to filtering of the pair of polarizers. The light-shielding adhesive layer 40 is disposed in the light-transmitting hole 261 of the first polarizer 262. In combination with FIG. 7, part of lights from the backlight module 24 enter the first polarizer 262 and leak out via the light-transmitting hole 261 of the first polarizer 262, and the light-shielding adhesive layer 40 prevents the part of the lights from entering the camera 30 via the first through hole 241, such that the lights from the first polarizer 262 is prevented from being provided to the camera 30, that is, the light-incident surface 32a of the camera 30 is prevented from receiving the lights leaked from the first polarizer 262, thereby improving the shooting effects of the camera 30.

Referring to FIG. 3 and FIG. 4, in an implementation, the plastic ring 240 includes a first inner wall 240b facing the camera 30. The light-shielding adhesive layer 40 includes a second inner wall 40a facing the camera 30. The first inner wall 240b is flush with the second inner wall 40a, such that the light-shielding adhesive layer 40 is prevented from contacting the housing 34 of the camera 30, thereby fixation of the camera 30 is not affected. The camera 30 is fixed in the first through hole 241 only via the plastic ring 240.

Figure 8:
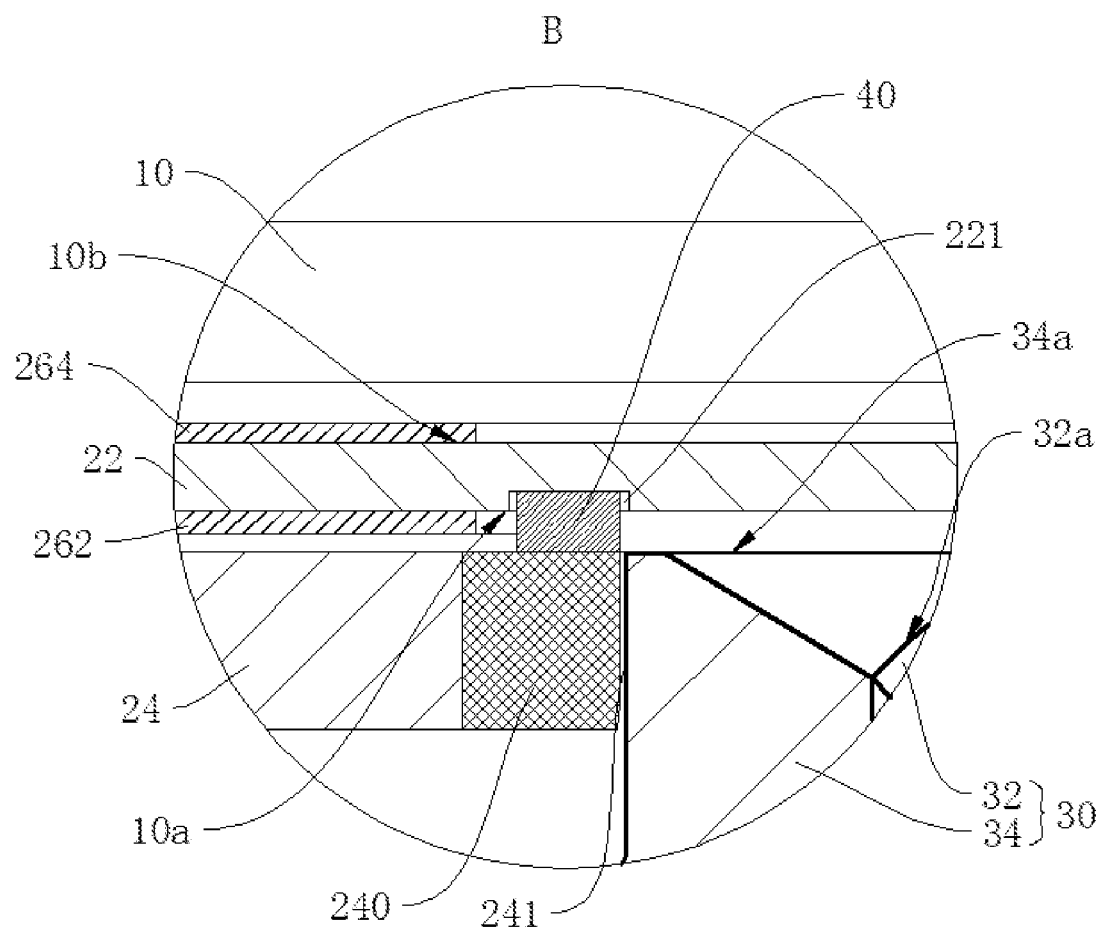
FIG. 8 is a schematic view illustrating a screen assembly according to an implementation.

Referring to FIG. 8, in an implementation, the inner surface 10a defines a recess 221. The light-shielding adhesive layer 40 is partially received in the recess 221. In an implementation, during spraying light-shielding adhesive for forming the light-shielding layer 40, the recess 221 can receive some light-shielding adhesive, which can avoid adhesive overflow and improve the effect of spraying the light-shielding adhesive, thereby improving position accuracy of the light-shielding adhesive layer 40 and improving light-shielding effects of the light-shielding adhesive layer 40.

The camera 30 is disposed in a hole below the screen assembly 100, which can reduce a space occupied by the camera 30 in a display region of the screen assembly 100, thereby increasing the screen-to-body ratio of the electronic device 200. The light-shielding adhesive layer 40 is disposed between the plastic ring 240 and the liquid crystal panel 22 to separate the camera 30 from the backlight module 24, and thus the lights from the backlight module 24 that leak out via the first through hole 241 can be prevented from reaching the light-incident surface 32a of the camera 30, that is, the backlight module 24 is prevented from providing lights to the camera 30, thereby improving the shooting effects of the camera 30.

Figure 9:
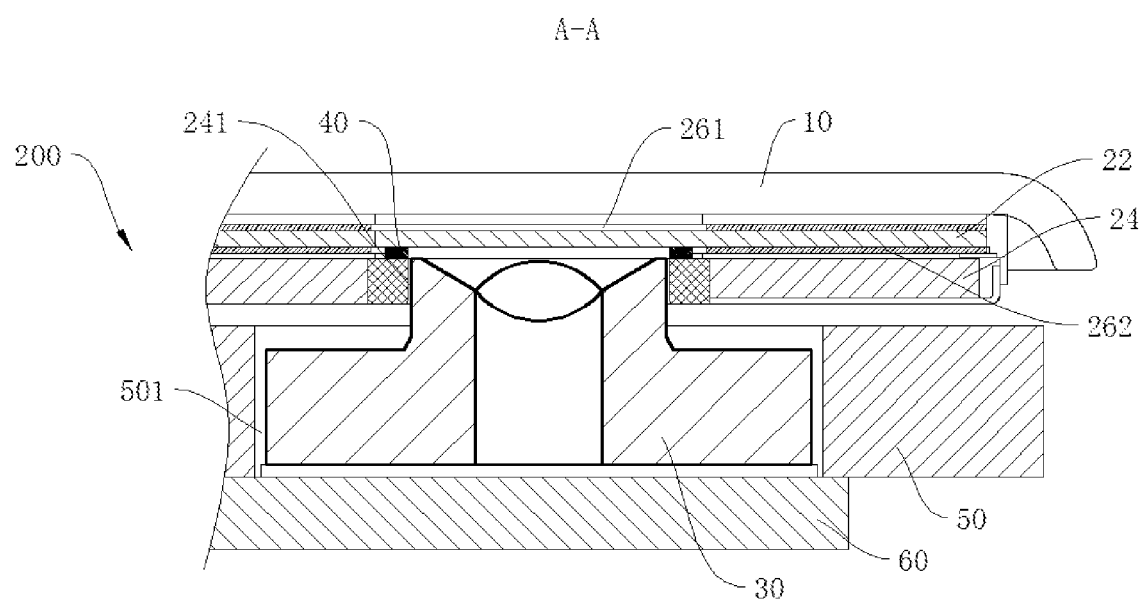
FIG. 9 is a schematic view illustrating an electronic device according to an implementation of the present disclosure.

Referring to FIGS. 1 and 9, an electronic device 200 is further provided according to an implementation of the present disclosure. The electronic device 200 includes the screen assembly 100 provided in the implementation of the present disclosure. With respect to illustration of the screen assembly 100, reference is made to the above implementation, and details of the screen assembly 100 will not be repeated herein. Referring to FIG. 9, in an implementation, the electronic device 200 further includes a front casing 50 and a circuit board 60. The screen assembly 100 and the circuit board 60 are respectively disposed on two opposite sides of the front casing 50. The front casing 50 defines a second through hole 501 directly facing the first through hole 241. The camera 30 is disposed on the circuit board 60. The camera 30 passes through the second through hole 501 and is partially received in the first through hole 241. In an implementation, the front casing 50 is in the shape of a plate and made of a metal or alloy material. The front casing 50 is the main support structure of the electronic device 200. In an implementation, the circuit board 60 is fixed to the front casing 50 in a manner such as adhesive or fasteners. The screen assembly 100 is also fixed to the front casing 50 in a manner such as adhesive or fasteners. The camera 30 is coupled to the circuit board 60 in a manner such as welding and electrically coupled with the circuit board 60. In an implementation, the circuit board 60 is operable to control the camera 30 to take images.

In an implementation, an interference fit exits between the camera 30 and the second through hole 501, such that a degree of freedom of the camera 30 on a radial plane of the first through hole 241 is limited. In an implementation, the camera 30 is clamped on an inner side of the second through hole 501, such that the camera 30 is fixed via the front casing 50, and the camera 30 can be well fixed. In an implementation, the front casing 50 and the backlight module 24 can be both used to fix the camera 30.

In an implementation, the camera 30 is disposed in a hole below the screen assembly 100, which can reduce a space occupied by the camera 30 in a display region of the screen assembly 100, thereby increasing a screen-to-body ratio of the electronic device.

Figure 10:
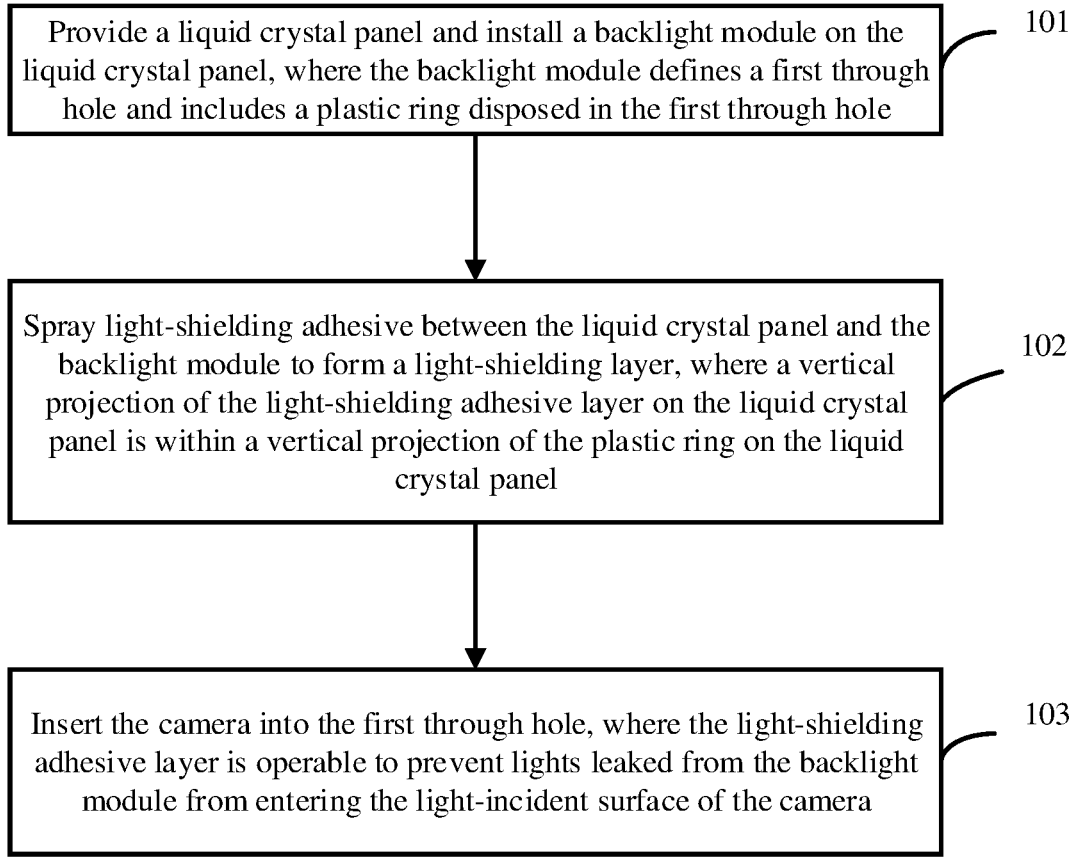
FIG. 10 is schematic flow chart illustrating a method for manufacturing an electronic device according to an implementation of the present disclosure.

Referring to FIG. 10, a method for manufacturing an electronic device is further provided according to an implementation of the present disclosure. The method is used for manufacturing an electronic device provided in the implementation of the present disclosure. The method includes the following.

At 101, provide a liquid crystal panel and install a backlight module on the liquid crystal panel. The backlight module defines a first through hole and includes a plastic ring disposed in the first through hole.

In an implementation, the first through hole is in a display region of a screen assembly, which can reduce an effect of the first through hole on a screen-to-body ratio of the screen assembly. Furthermore, the first through hole extends through the backlight module. In an implementation, the first through hole is in the shape of a circle.

In an implementation, a process of manufacturing the liquid crystal panel includes providing a first substrate and a second substrate. The firs substrate is opposite to the second substrate. Liquid crystal molecules are filled between the first substrate and the second substrate to form the liquid crystal panel. In an implementation, the first substrate may be a color-film substrate, and the second substrate is an array substrate. In an implementation, after manufacturing the liquid crystal panel, a first polarizer and a second polarizer are respectively attached to two opposite sides of the liquid crystal panel. A polarization direction of the first polarizer and a polarization direction of the second polarizer are opposite. The first polarizer and the second polarizer both define a light-transmitting hole. The backlight module is disposed on a side of the liquid crystal panel facing the first polarizer, and the first through hole directly faces the light-transmitting hole.

In an implementation, prior to installing the backlight module on the liquid crystal panel, the method for manufacturing the electronic device further includes providing a transparent cover and attaching the liquid crystal panel to the transparent cover. In an implementation, the transparent cover is a rigid plate that has a certain strength and high light transmittance. In an implementation, the transparent cover is a glass cover. The light transmittance of the glass cover is high and the cost of the glass cover is relatively low. In other implementations, the transparent cover may be a plastic cover. In an implementation, the liquid crystal panel is attached to the transparent cover via OCA. The OCA has a high adhesive strength and relatively high transparency, which may have a low impact on display effects of the liquid crystal panel.

At 102, spray light-shielding adhesive between the liquid crystal panel and the backlight module to form a light-shielding layer, where a vertical projection of the light-shielding adhesive layer on the liquid crystal panel is within a vertical projection of the plastic ring on the liquid crystal panel.

In an implementation, the light-shielding adhesive layer is disposed between the backlight module and the liquid crystal panel, and the vertical projection of the light-shielding adhesive layer on the liquid crystal panel is within the vertical projection of the plastic ring on the liquid crystal panel. The light-shielding adhesive layer can prevent lights leaked from the backlight module from entering the light-incident surface of the camera. The light-shielding adhesive layer has certain elasticity, is light, and can be quickly fixed via pressure-sensitive fixation, conveniently used, freely bent, and made to be ultrathin, and is reliable. In the implementation, a side of the light-shielding adhesive layer is disposed on the inner surface of the liquid crystal panel, and the other side of the light-shielding adhesive layer abuts against the plastic ring, such that the light-shielding adhesive layer is compressed between the liquid crystal panel and the backlight module. When the light-shielding adhesive layer is compressed, the light-shielding adhesive layer has a certain deformation, such that a joint between the light-shielding adhesive layer and the liquid crystal panel can be well sealed. Furthermore, the plastic ring includes a top side surface facing the liquid crystal panel. The top side surface is in contact with the light-shielding adhesive layer, such that the light-shielding adhesive layer is compressed between the top side surface and the inner surface.

In an implementation, a nozzle is inserted into the first through hole. During spraying the light-shielding adhesive layer, the nozzle is fixed and the liquid crystal panel and the backlight module are rotated, or the liquid crystal panel and the backlight module are fixed and the nozzle is rotated.

At block 103, the camera is inserted into the first through hole, where the light-shielding adhesive layer is operable to prevent lights leaked from the backlight module from entering the light-incident surface of the camera.

The camera includes a housing and an optical member received in the housing. The housing defines an opening to expose the optical member. In an implementation, a top portion of the housing is in the shape of a cylinder. The optical member is disposed in the top portion in the shape of a cylinder and receives ambient lights via the opening. In a first direction X, i.e., a radial direction of the first through hole, the optical member is separated from the backlight module via the housing. The housing includes a top surface. The light-incident surface of the camera is a surface of the optical member that receives the ambient lights. The light-incident surface of the camera is recessed in the camera. In other words, in a second direction Y, i.e., an axial direction of the first direction, the light-incident surface of the camera is disposed below the top surface. Lights from the backlight module may inevitably leak out via the first through hole. The lights that leak out via the first through hole travel towards the camera. The light-shielding adhesive layer blocks a propagation of the lights to the optical member in the housing, that is, prevents the backlight module from providing the lights to the camera, i.e., prevents the light-incident surface of the camera from receiving the lights leaked from the backlight module, thereby improving shooting effects of the camera.

In an implementation, the light-shielding adhesive layer is in the shape of a ring. Ambient lights pass through a central hole in the light-shielding adhesive layer and the opening sequentially and then enter the light-incident surface to be imaged on the optical member. Only the ambient lights that can pass through the transparent cover and the liquid crystal panel can pass through the central hole in the light-shielding adhesive layer and the opening sequentially and then enter the light-incident surface to be imaged on the optical member, and lights leaked from the backlight module are prevented from entering the optical member due to the light-shielding adhesive layer.

In an implementation, prior to inserting the camera into the first through hole, the camera is mounted on a circuit board, and the circuit board is mounted on a front casing. The front casing defines a second through hole, and the camera passes through the second through hole. In an implementation, the front casing is in the shape of a plate and made of a metal or alloy material. The front casing is the main support structure of the electronic device. In an implementation, the circuit board is fixed to the front casing in a manner such as adhesive or fasteners. The screen assembly is also fixed to the front casing in a manner such as adhesive or fasteners. The camera is coupled to the circuit board in a manner such as welding and electrically coupled with the circuit board. In an implementation, the circuit board is operable to control the camera to take images.

The camera is disposed in a hole below the screen assembly, which can reduce a space occupied by the camera in a display region of the screen assembly, thereby increasing a screen-to-body ratio of the electronic device. The light-shielding adhesive layer is disposed between the plastic ring and the liquid crystal panel to separate the camera from the backlight module, and thus the lights from the backlight module that leak out via the first through hole can be prevented from reaching the light-incident surface of the camera, that is, the backlight module is prevented from providing the lights to the camera, thereby improving the shooting effects of the camera.

In the description of the implementations of the present disclosure, it should be understood that directions or positional relationships indicated by terms "center", "longitudinal", "transverse", "length", "width", "thickness", "upper", "lower", "front", "rear/back", "left", "right", "vertical", "horizontal", "top", "bottom", "inner", "outer", "clockwise", and "counterclockwise" and so on are based on directions or positional relationships illustrated in the accompany drawings. The terms are merely for the convenience of describing the disclosure and simplifying the description, and do not indicate or imply that the device or elements indicated must have a specific orientation and need to be constructed and operated in the specific orientation. Therefore, the terms cannot be understood as a restriction on the implementations of this disclosure. In addition, terms "first", "second", and the like are merely used for describing purposes, and cannot be understood as indicating or implying relative importance or implicitly indicating the number of indicated technical features. Therefore, the features defined with "first" and "second" may explicitly or implicitly include one or more of the features. In the description of the disclosure, "multiple/a plurality of/a number of" means two or more than two, unless otherwise specifically defined.

Unless stated otherwise, in the implementations of the disclosure, terms "installing", "coupling", "connecting", and the like referred to herein should be understood in broader sense. For example, coupling may be a fixed coupling, a detachable coupling, or an integrated coupling, may be a mechanical coupling, an electrical coupling, or communication with each other, and may be a direct coupling, an indirect coupling through a medium, or a communication coupling between two components or an interaction coupling between two components, unless stated otherwise. For those of ordinary skill in the art, the definitions of the above terms in the implementations of the present disclosure can be understood according to specific situations.

Unless stated otherwise, in the implementations of the disclosure, a first feature being "on" or "under" a second feature referred to herein can refer to a direct contact between the first feature and the second feature or an indirect contact between the first feature and the second feature via a medium. In addition, the first feature being "above", "over", and "on" the second feature can be the first feature being right above or obliquely above the second feature or only refers to the first feature being at a higher horizontal level than the second feature. The first feature being "below", "underneath", and "under" the second feature can be the first feature being right below or obliquely below the second feature or only refers to the first feature being at a lower horizontal level than the second feature.

The following disclosure provides multiple different implementations or examples to achieve different structures of the implementations of the present disclosure. To simplify the disclosure of the implementations of the present disclosure, description of the components and arrangements of specific examples is given below. Of course, they are only illustrative and not intended to limit the present disclosure. Moreover, in the present disclosure, reference numbers and/or letters may be repeated in different implementations. Such repetition is for the purposes of simplification and clearness, and does not denote the relationship between respective implementations and/or arrangements being discussed. In addition, the present disclosure provides various examples for specific process and materials. However, it is obvious for a person of ordinary skill in the art that other process and/or materials may alternatively be utilized.

The reference term "an implementation", "some implementations", "illustrative implementation", "implementation", "specific implementation", or "some implementations" referred to herein means that a particular feature, structure, material, or characteristic described in conjunction with the implementation or implementation may be contained in at least one implementation or example of the present disclosure. The illustrative expression of the terms in the specification does not necessarily refer to the same implementations or examples. The detailed feature, structure, material, or characteristic described may be properly combined in any one or more implementations or examples.

The implementations of the disclosure are described in detail above, and specific examples are used in this specification to illustrate the principles and implementation of the disclosure. The descriptions of the above implementations are only used to help in understanding the methods and core ideas of the disclosure. Meanwhile, a person of ordinary skill in the art, based on the idea of the disclosure, can make changes for the specific implementation and the application scope. In summary, the content of this specification should not be construed as a limitation to the disclosure.

What is claimed is:

1. A screen assembly, comprising:
 a liquid crystal panel;
 a backlight module disposed on a side of the liquid crystal panel and defining a first through hole, wherein the backlight module comprises a plastic ring disposed in the first through hole;
 a camera at least partially received in the first through hole, wherein the camera is fixed in the first through hole via the plastic ring; and
 a light-shielding adhesive layer disposed between the backlight module and the liquid crystal panel, wherein a vertical projection of the light-shielding adhesive layer on the liquid crystal panel is within a vertical projection of the plastic ring on the liquid crystal panel, and the light-shielding adhesive layer is operable to prevent lights leaked from the backlight module from entering a light-incident surface of the camera;
 wherein the liquid crystal panel comprises an inner surface facing the backlight module;
 wherein the plastic ring comprises a top side surface facing the liquid crystal panel; and
 wherein the light-shielding adhesive layer is in contact with the inner surface and the top side surface, such that the light-shielding adhesive layer is compressed between the liquid crystal panel and the plastic ring.

2. The screen assembly of claim 1, further comprising a first polarizer disposed between the liquid crystal panel and the backlight module, wherein the first polarizer defines a light-transmitting hole directly facing the first through hole, and the light-shielding adhesive layer is disposed in the light-transmitting hole.

3. The screen assembly of claim 2, wherein
 the camera comprises a housing and an optical member received in the housing, wherein the housing defines an opening to expose the optical member;

the light-shielding adhesive layer is in a shape of a ring; and ambient lights pass through a central hole in the light-shielding adhesive layer and the opening sequentially to be imaged on the optical member.

4. The screen assembly of claim 3, wherein
the plastic ring comprises a first inner wall facing the camera; and
the light-shielding adhesive layer comprises a second inner wall facing the camera, wherein the second inner wall is flush with the first inner wall.

5. The screen assembly of claim 1, wherein
the inner surface defines a recess; and
the light-shielding adhesive layer is partially received in the recess.

6. The screen assembly of claim 1, further comprising a transparent cover disposed on a side of the liquid crystal panel facing away from the backlight module.

7. An electronic device comprising:
a screen assembly comprising:
a liquid crystal panel;
a backlight module disposed on a side of the liquid crystal panel and defining a first through hole, wherein the backlight module comprises a plastic ring disposed in the first through hole;
a camera at least partially received in the first through hole, wherein the camera is fixed in the first through hole via the plastic ring; and
a light-shielding adhesive layer disposed between the backlight module and the liquid crystal panel, wherein a vertical projection of the light-shielding adhesive layer on the liquid crystal panel is within a vertical projection of the plastic ring on the liquid crystal panel, and the light-shielding adhesive layer is operable to prevent lights leaked from the backlight module from entering a light-incident surface of the camera;
wherein the liquid crystal panel comprises an inner surface facing the backlight module;
wherein the plastic ring comprises a top side surface facing the liquid crystal panel; and
wherein the light-shielding adhesive layer is in contact with the inner surface and the top side surface, such that the light-shielding adhesive layer is compressed between the liquid crystal panel and the plastic ring.

8. The electronic device of claim 7, wherein the screen assembly further comprises a first polarizer disposed between the liquid crystal panel and the backlight module, wherein the first polarizer defines a light-transmitting hole directly facing the first through hole, and the light-shielding adhesive layer is disposed in the light-transmitting hole.

9. The electronic device of claim 8, wherein
the camera comprises a housing and an optical member received in the housing, wherein the housing defines an opening to expose the optical member;
the light-shielding adhesive layer is in a shape of a ring; and
ambient lights pass through a central hole in the light-shielding adhesive layer and the opening sequentially to be imaged on the optical member.

10. The electronic device of claim 9, wherein
the plastic ring comprises a first inner wall facing the camera; and
the light-shielding adhesive layer comprises a second inner wall facing the camera, wherein the second inner wall is flush with the first inner wall.

11. The electronic device of claim 7, wherein
the inner surface defines a recess; and
the light-shielding adhesive layer is partially received in the recess.

12. The electronic device of claim 7, wherein the screen assembly further comprises a transparent cover disposed on a side of the liquid crystal panel facing away from the backlight module.

13. The electronic device of claim 7, further comprising a front casing and a circuit board, wherein the screen assembly and the circuit board are respectively disposed on two opposite sides of the front casing, the front casing defines a second through hole directly facing the first through hole, and the camera is disposed on the circuit board and passes through the second through hole to be partially received in the first through hole.

14. The electronic device of claim 13, wherein an interference fit exists between the camera and the second through hole.

15. A method for manufacturing an electronic device, comprising:
providing a liquid crystal panel and installing a backlight module on the liquid crystal panel, wherein the backlight module defines a first through hole and comprises a plastic ring disposed in the first through hole, wherein the liquid crystal panel comprises an inner surface facing the backlight module, and the plastic ring comprises a top side surface facing the liquid crystal panel;
spraying light-shielding adhesive between the liquid crystal panel and the backlight module to form a light-shielding adhesive layer, wherein a vertical projection of the light-shielding adhesive layer on the liquid crystal panel is within a vertical projection of the plastic ring on the liquid crystal panel, wherein the light-shielding adhesive layer is in contact with the inner surface and the top side surface, such that the light-shielding adhesive layer is compressed between the liquid crystal panel and the plastic ring; and
inserting a camera in the first through hole, wherein the light-shielding adhesive layer is operable to prevent lights leaked from the backlight module from entering a light-incident surface of the camera.

16. The method for manufacturing the electronic device of claim 15, further comprising:
prior to installing the backlight module on the liquid crystal panel,
attaching a first polarizer to the liquid crystal panel, wherein the first polarizer defines a light-transmitting hole;
wherein installing the backlight module on the liquid crystal panel comprises:
installing the backlight module on a side of the liquid crystal panel facing the first polarizer, wherein the first through hole directly faces the light-transmitting hole.

17. The method for manufacturing the electronic device of claim 15, further comprising:
prior to installing the backlight module on the liquid crystal panel:
providing a transparent cover; and
attaching the liquid crystal panel to the transparent cover.

18. The method for manufacturing the electronic device of claim 15, further comprising:
prior to inserting the camera in the first through hole:
installing the camera on a circuit board; and
installing the circuit board on a front casing, wherein the front casing defines a second through hole, and the camera passes through the second through hole.

\* \* \* \* \*